United States Patent [19]

Berge

[11] 4,305,601

[45] Dec. 15, 1981

[54] SHOPPING CART FOR THE HANDICAPPED

[76] Inventor: Kermit Berge, 15 Ranchita Way, Chico, Calif. 95926

[21] Appl. No.: 130,616

[22] Filed: Mar. 17, 1980

[51] Int. Cl.³ .............................................. A61G 5/02
[52] U.S. Cl. ........................... 280/289 WC; 280/400; 280/495; 297/DIG. 4; 403/4; 403/388
[58] Field of Search .................. 280/400, 490 R, 202, 280/204, 289 WC, 292, 32.7, 495, 33.99 A; 297/DIG. 4; 248/225.3 A, 226.1; 403/4, 388

[56] References Cited

U.S. PATENT DOCUMENTS

| 2,513,619 | 7/1950 | Bennett | 248/225.3 A |
| 2,556,121 | 6/1951 | Thomas | 280/289 WC |
| 3,336,051 | 8/1967 | Dale | 280/490 R |
| 3,575,250 | 4/1971 | Dykes | 180/11 |

*Primary Examiner*—John A. Pekar
*Attorney, Agent, or Firm*—Flehr, Hohbach, Test, Albritton & Herbert

[57] ABSTRACT

A shopping cart for the handicapped. The shopping cart includes a wheeled frame which mounts a basket and wheelchair hitch assembly. The hitch assembly includes a releasable latch which can be manipulated by the handicapped person in the wheelchair for coupling and uncoupling of the wheelchair to the cart. A latch on the proximal end of the draw bar provides for attachment to the frame at positions within a vertical range as required for coupling with individual wheelchairs.

4 Claims, 5 Drawing Figures

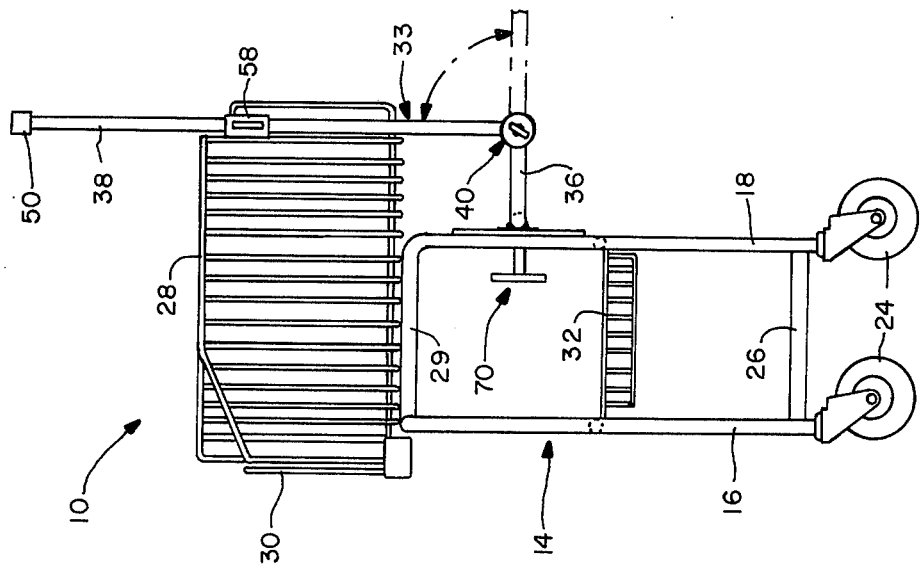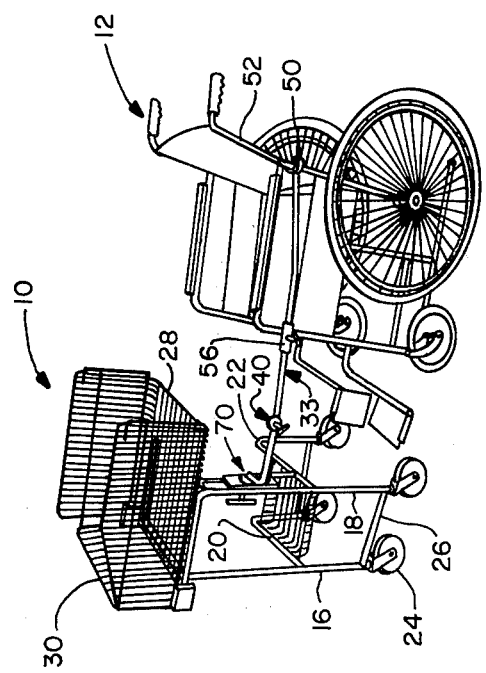

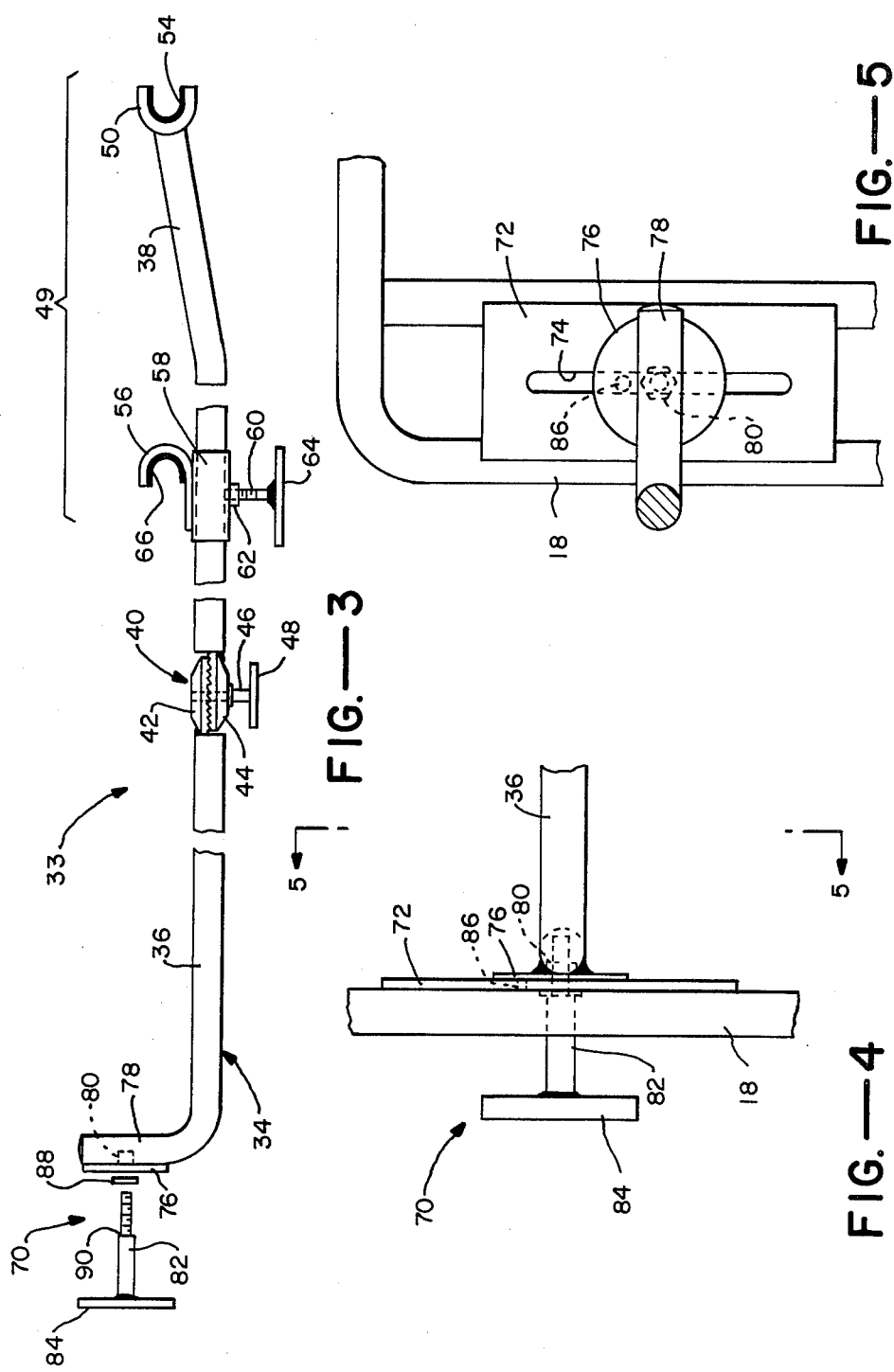

SHOPPING CART FOR THE HANDICAPPED

This invention relates to shopping carts, and in particular relates to shopping carts for the handicapped.

Conventional shopping carts used in supermarkets and the like are of tubular frame construction with swivel wheels and wire baskets. Handicapped persons who are confined to wheelchairs have difficulty in using conventional shopping carts in supermarkets. Among the reasons are that it is quite difficult for the handicapped person to simultaneously move and guide both the wheelchair and cart along the aisle while shopping for grocery items. Additionally, there is the risk of upsetting the cart due to the instability from the handicapped person's attempts to push or pull the cart from a sitting position.

Previously a number of shopping cart designs have been suggested for use by the handicapped. One such design is disclosed in U.S. Pat. No. 3,575,250 to Dykes in which a battery-powered, two-wheeled vehicle is hitched to the back of a standard shopping cart. However, this design would require the use of a specially designed vehicle which would be used in place of the handicapped person's individual wheelchair. Such a system would also be quite expensive and therefore infeasible for large-scale use in many store locations.

It is therefore an object of the present invention to provide a new and improved shopping cart for use with wheelchairs for the handicapped.

Another object is to provide a shopping cart which is detachably coupled to a handicapped person's wheelchair so that the cart and chair can be moved as a unit through the store for shopping.

Another object is to provide a shopping cart having a hitch arranged to permit the handicapped person to readily attach and detach the cart while seated in the wheelchair.

Another object is to provide a shopping cart of the type described which is adaptable for use with a variety of different wheelchairs and which can be readily adjusted by the handicapped person for use with his individual wheelchair.

The invention in summary comprises a shopping cart having a wheeled frame which carries a basket together with a hitch assembly. The hitch assembly includes a draw bar mounted on one of its ends to a post of the frame. A releasable latch is provided on the draw bar for detachably coupling with the wheelchair, and the latch is readily accessible for operation by a handicapped person sitting in the wheelchair.

The foregoing and additional objects and features of the invention will appear from the following specification in which the several embodiments have been set forth in detail in conjunction with the accompanying drawings.

FIG. 1 is a perspective view illustrating the shopping cart of the invention shown hitched to a wheelchair.

FIG. 2 is a side elevation view to an enlarged scale of the shopping cart of FIG. 1 with the hitch shown in stowed position.

FIG. 3 is a top plan view, to an enlarged scale and partially broken away, of the hitch for the cart of FIGS. 1 and 2.

FIG. 4 is a fragmentary elevational view to an enlarged scale of the latch connecting the hitch to the cart of FIG. 2.

FIG. 5 is an elevational view of the latch taken along the line 5—5 of FIG. 4.

The drawings illustrate generally at 10 a preferred embodiment for the shopping cart of the invention. Shopping cart 10 is adapted to be releasably coupled to a handicapped person's wheelchair as depicted by the typical wheelchair 12 of FIG. 1.

Shopping cart 10 includes a frame 14 of tubular steel construction having a pair of main upright posts 16, 18 on one side with a pair of secondary tubular posts 20, 22 extending horizontal outwardly and then downwardly to an opposite side. Four swivel wheels 24 are mounted at the lower ends of the posts and a pair of tubular braces 26 are fixed between opposite ends of the posts.

The cart includes a main basket 28 which is of wire frame construction and is mounted on one side at the top end 29 of the main post. The main basket projects by cantilever support over the center of the cart to permit the basket to hang over the upper surface of the counter as the cart is moved through the checkstand. One end of the basket is provided with a pivoting end gate 30 while the opposite end adjacent the wheelchair is open for convenient access by the handicapped person. A lower basket tray 32, also of wire frame construction, is mounted at an intermediate level on the tubing.

A hitch assembly 33 is provided for connecting the cart with the wheelchair so that they can be moved as a unit along the shopping aisles through the store. The hitch assembly includes a draw bar 34, preferably of tubular steel, having a first end 36 and second end 38 which are connected by a swivel joint 40. Swivel joint 40 comprises a ratchet clamp which includes first and second discs 42, 44 with the facing surfaces of each disc formed with radial teeth. The disc 42 is secured to the draw bar end 36 while the opposite disc 44 is secured to the draw bar end 38. The two discs are mounted together by a bolt 46 which extends through threaded holes and, when manually turned by handle 48, forces the ratchet teeth together into locking engagement so that the draw bar ends are fixedly held as a rigid unit in the extended position of FIG. 3. The bolt is turned for releasing the ratchet teeth so that draw bar end 38 can be pivoted upwardly into the stowed position of FIG. 2. In the stowed position, the draw bar is raised so that the cart can be parked in a minimum of space.

Releasable latch means 49 is provided on draw bar end 38 for detachably coupling to tubular parts of the wheelchair. The latch means includes a fixed socket 50 secured as by welding to the distal end of the draw bar. The fixed socket is of open-ended U-shaped configuration adapted for seating against the circular front surface of the upright tubing 52 which extends along one side of the back of the wheelchair. A rubber lining 54 is cemented along the inner surface of socket 50 for cushioning with the tubing of the wheelchair. Latch means 49 further includes an adjustable socket 56 mounted intermediate draw bar end 38. Socket 56 is of open-ended U-shaped configuration and faces in a direction opposite that of the fixed socket. Socket 56 is affixed to a side of a sleeve 58 which is mounted for sliding movement lengthwise of the draw bar. The socket is locked to a selected position along the draw bar by means of a locking bolt 60 which is threaded through a nut 62 on the side of the sleeve and through an opening in the sleeve for engagement with the draw bar. An operating handle 64 is affixed to the end of the bolt within easy reach of the handicapped person so that he can readily operate the latch while seated. A rubber lining 66 is cemented to the inside of the socket for cushion against the rearwardly facing surface of the upright tubing 68 at one side of the front of the chair. The range of movement of the adjustable socket along the draw bar as well as the open-ended construction of the two sockets permits the hitch to be attached with a range of different size wheelchairs. With the two sockets seated against the wheelchair tubing and with the latch means locked, the draw bar is rigidly secured to the wheelchair so that the latter can be moved with the shopping cart as a unit.

FIGS. 3–5 illustrate details of the latch means 70 for securing the proximal end of the draw bar to the shopping cart. An adjustment plate 72 provided with a vertically extending slot 74 is secured as by welding to the outside of the vertical tubing 18 on the frame. A circular mounting plate 76 is welded to the inwardly bent end 78 of the draw bar and a threaded nut 80 is secured within the tubing end in alignment with an opening formed in the plate. A threaded bolt 82 carrying a handle 84 is provided for attaching the plates together at the desired vertical position within the range of slot 74. The plate 76 carries a short pin 86 which projects into slot 74 for maintaining alignment. The threaded end of the bolt projects through a washer 88, thence through the slot 74, and thence through the nut 80 within the end of the draw bar. When the bolt handle is turned down, an enlarged shoulder 90 on the bolt forces the washer and plates into locking engagement. The bolt can be released to permit vertical movement of plate until the desired vertical height of the draw bar is achieved. The bolt handle is within easy reach of the handicapped person while seated in the wheelchair so that he can readily adjust the draw bar to accommodate his individual wheelchair.

In the use and operation of the invention the store location would typically have one or more of the shopping carts 10 available for handicapped shoppers. When a handicapped person desires to use the cart, he will maneuver his wheelchair into position so that he can release ratchet clamp 40, lower the distal end of the draw bar to a horizontal position, and then relock the clamp. The handicapped person can then turn bolt 82 to release the latch 70 and then move the draw bar to the desired vertical position with the latch relocked on the cart frame. Fixed socket 50 is then seated against the rear tubing of the wheelchair and socket 56 is moved along the draw bar until it seats against the front tubing of the wheelchair. When the desired fit of the sockets is achieved, the handicapped person can operate the handle of bolt 60 for locking the socket to the draw bar. The handicapped person can then maneuver his wheelchair for shopping with the draw bar pushing the cart along as a unit. The operator's hands are thus free to maneuver the wheelchair while placing grocery and other shopping items in the cart baskets. When shopping is completed, the handicapped person can readily uncouple from the cart by turning locking bolt 60 and sliding socket 56 along the draw bar so that both sockets are released from the wheelchair.

While the foregoing embodiments are at present considered to be preferred, it is understood that numerous variations and modifications may be made therein by those skilled in the art and it is intended to cover in the appended claims all such variations and modifications as fall within the true spirit and scope of the invention.

What is claimed is:

1. A shopping cart for use with wheelchairs for the handicapped, including the combination of a wheeled frame having at least one upright post, a basket mounted on the post, and a hitch assembly for detachably coupling with wheelchair, the hitch assembly including a draw bar mounted at one of its ends on the post, and releasable latch means for coupling with the wheelchair, said latch means being accessible to an operator in a wheelchair for coupling and uncoupling of the draw bar, the latch means comprising a fixed socket mounted at the distal end of the draw bar and engageable with a portion of the wheelchair, the latch means further including an adjustable socket mounted for sliding movement lengthwise of the draw bar and engageable with another portion of the wheelchair, and means for locking the adjustable socket at a position on the draw bar in which both sockets engage their corresponding portions of the wheelchair and securely latch the draw bar to the wheelchair.

2. A shopping cart as in claim 1 in which the fixed socket is in an open-ended U-shaped configuration for seating against a tubular portion of the wheelchair, and the adjustable socket is in an open-ended U-shaped configuration facing in a direction opposite of the fixed socket for seating against another tubular portion of the wheelchair.

3. A shopping cart as in claim 1 in which the means for locking the adjustable socket includes a sleeve carrying the adjustable socket and mounted for sliding movement along the draw bar, together with a locking bolt threadedly mounted through the sleeve for releasable engagement with the draw bar, and an operating handle attached to the distal end of the bolt and accessible to the operator in the wheelchair.

4. A shopping cart as in claim 1 in which the hitch assembly includes means for mounting the proximal end of the draw bar for attachment on the frame at selected positions within a vertical range whereby the operator can match the vertical elevation of the draw bar with an individual wheelchair being used with the shopping cart, said last-mentioned means including a vertically slotted plate mounted on the cart frame, and an attachment bolt threadably mounted in the distal end of the draw bar and extending through the slotted plate for detachably locking the draw bar to the plate.

* * * * *